(12) United States Patent
Elliott et al.

(10) Patent No.: US 11,125,591 B2
(45) Date of Patent: Sep. 21, 2021

(54) SYSTEMS AND METHODS FOR CORRECTING NON-SINUSOIDAL SIGNALS GENERATED FROM NON-CIRCULAR COUPLERS

(71) Applicant: KSR IP Holdings, LLC, Wilmington, DE (US)

(72) Inventors: Ryan W. Elliott, Thamesville (CA); Michael Meyer, Ridgetown (CA)

(73) Assignee: KSR IP Holdings, LLC, Wilmington, DE (US)

( * ) Notice: Subject to any disclaimer, the term of this patent is extended or adjusted under 35 U.S.C. 154(b) by 473 days.

(21) Appl. No.: 15/998,441

(22) Filed: Aug. 15, 2018

(65) Prior Publication Data

US 2019/0056251 A1 Feb. 21, 2019

Related U.S. Application Data

(60) Provisional application No. 62/545,627, filed on Aug. 15, 2017.

(51) Int. Cl.
*G01D 18/00* (2006.01)
*G01D 5/20* (2006.01)
*G01D 3/032* (2006.01)

(52) U.S. Cl.
CPC .......... *G01D 18/004* (2013.01); *G01D 3/032* (2013.01); *G01D 5/2053* (2013.01); *G01D 5/2073* (2013.01)

(58) Field of Classification Search
CPC .. G01D 5/2053; G01D 5/2073; G01D 18/004; G01D 3/032
See application file for complete search history.

(56) References Cited

U.S. PATENT DOCUMENTS

| | | | | |
|---|---|---|---|---|
| 6,236,199 B1* | 5/2001 | Irle | ...................... | G01D 5/2073 324/207.17 |
| 6,304,076 B1* | 10/2001 | Madni | .................. | G01D 5/2053 318/660 |
| 6,522,128 B1* | 2/2003 | Ely | .......................... | G01B 7/30 324/207.17 |
| 6,985,018 B2* | 1/2006 | Madni | .................. | G01D 5/2053 324/207.17 |

(Continued)

*Primary Examiner* — Walter L Lindsay, Jr.
*Assistant Examiner* — Milton Gonzalez
(74) *Attorney, Agent, or Firm* — Dinsmore & Shohl LLP

(57) ABSTRACT

A system including a non-circular coupler, a sensor, a memory module, and a processor module is provided. The sensor includes a transmitter coil adapted to be energized by a high frequency current source and at least two receiving coils. One of the receiver coils generate a sine-like function output signal and the other generates a cosine-like function output signal upon rotation of the coupler. The memory module is operable to compensate for non-sinusoidal output signals caused by a plurality of geometric errors and a gap between the coupler and the at least two receiving coils. The processor module configured to process the non-sinusoidal output signals from both the first and second receiver coils, determine an error in the non-sinusoidal output signals from both the first and second receiver coils, mathematically compensate the assembly to eliminate the error and generates an output signal representative of the rotational position of the coupler.

19 Claims, 6 Drawing Sheets

(56) References Cited

U.S. PATENT DOCUMENTS

| | | | |
|---|---|---|---|
| 7,906,960 B2 * | 3/2011 | Lee | G01B 7/30 324/207.25 |
| 2011/0181302 A1 | 7/2011 | Shao et al. | |
| 2014/0117980 A1 | 5/2014 | Ely | |
| 2015/0301084 A1 | 10/2015 | Elliott et al. | |
| 2016/0123771 A1 | 5/2016 | David et al. | |
| 2016/0313141 A1 | 10/2016 | Lowery et al. | |

* cited by examiner

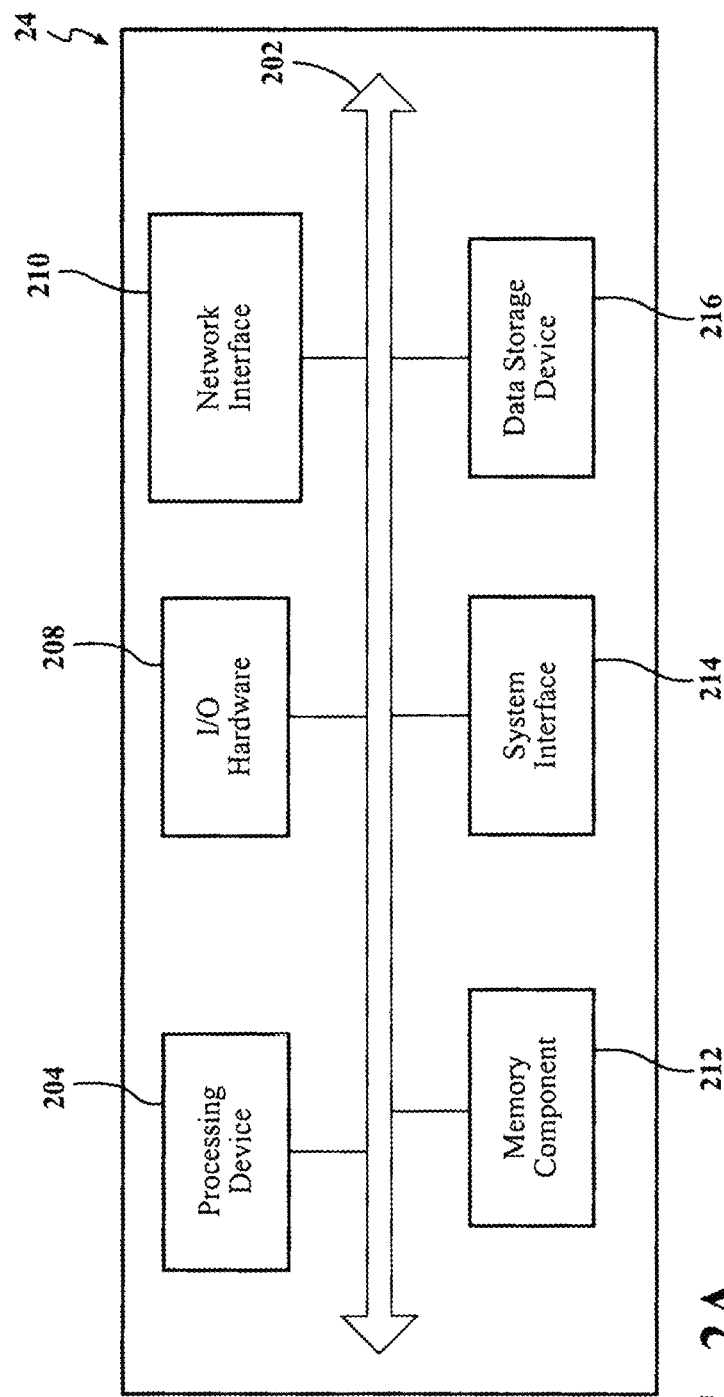
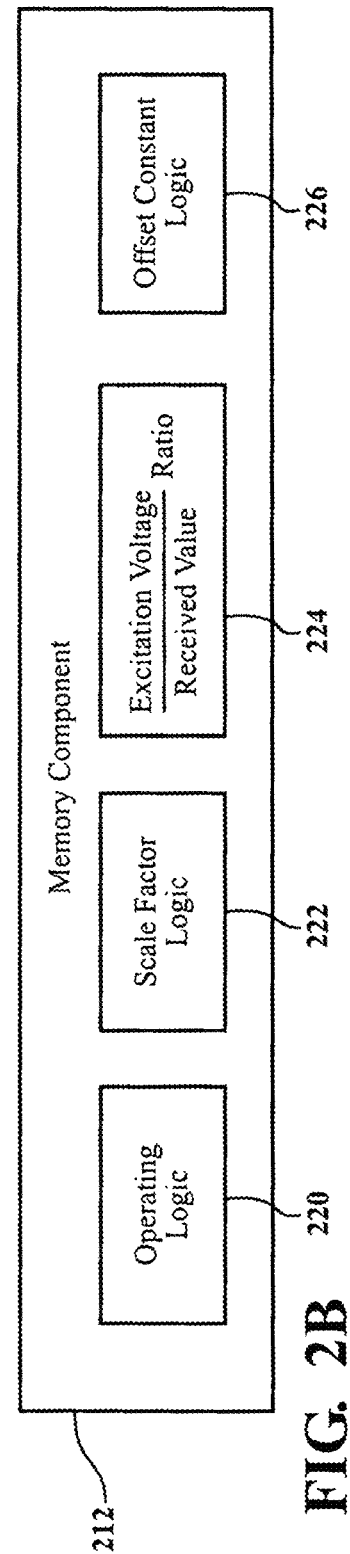
FIG. 2A
FIG. 2B

SYSTEMS AND METHODS FOR CORRECTING NON-SINUSOIDAL SIGNALS GENERATED FROM NON-CIRCULAR COUPLERS

CROSS-REFERENCE TO RELATED APPLICATIONS

This application claims the benefit of U.S. Provisional Application No. 62/545,627, filed Aug. 15, 2017, the contents of which are included herein by reference.

TECHNICAL FIELD

The present specification generally relates to rotary sensors and, more specifically to systems for correcting errors in an output of rotary sensors.

BACKGROUND OF THE INVENTION

It is known to use a non-circular couplers in conjunction with a transmitter coil formed on a printed circuit board (PCB) and excited by a high frequency signal. At least two receiver coils are also formed on the PCB and is arranged in multiple segments around the PCB hoard wherein each segment is oppositely wound from the adjacent segments. The coupler may then mounted relative to the PCB board so that the coupler is planar and overlies a portion of the PCB board. The coupler is constructed of an electrically conductive material so that rotation of the coupler relative to the PCB board varies the inductive coupling between the transmitting coil and receiving coils and thus varies the voltage output from the receiver coils. Consequently, the voltage output on the receiver coils is proportional to the relative rotational position of the coupler.

Generally, couplers are made of metal and will have eddy currents flowing in the presence of a high frequency magnetic field. The eddy currents will produce a magnetic field that opposes the magnetic field that produced it. The result is that the alternating magnetic field directly below the coupler will be reduced in magnitude. With different coupler geometries, it is known that non-sinusoidal input signals are generated, which result in error, such as fourth and eighth order harmonic errors. The fourth and eighth order harmonic errors cause a deviation from a perfect sinusoid wave at specific locations on the sine wave during every cycle. As such the harmonic errors create an electrical angle error in addition to the known mechanical error. The deviation from a perfect sinusoid wave may occur with any non-circular coupler in any system that relies on a sine/cosine input wave including linear coil designs. Further, the non-sinusoidal input signals may vary based on an airgap between the coupler and the receiving coils.

Current solutions to reduce or eliminate the non-sinusoidal input signals use complicated coil shapes and/or coupler shapes that are shaped to generate the sine signal. Further, the current solutions have the disadvantage of reducing the received signal because it does not maximize the coil area to the amiable board area in a circle with respect to segment coils.

Accordingly, it is desirable to provide an uncomplicated sensor system that has a correction factor that fundamentally eliminates error associated with the non-sinusoidal input signals regardless of the airgap.

SUMMARY

In one embodiment, a system including a coupler, a sensor, a memory module, and a processor module is provided. The sensor is spaced apart from the coupler to form a gap. The sensor includes a transmitter coil adapted to be energized by a high frequency current source and at least two receiving coils generating a non-sinusoidal output signals, one of the receiver coils generates a sine-like function upon rotation of the coupler and the other of the receiver coils generates a cosine-like function upon rotation of the coupler. The memory module is operable to compensate for the non-sinusoidal output signal caused by a plurality of geometric errors and the gap between the coupler and the at least two receiving coils.

The processor module is communicatively coupled to the memory module. The processor module is configured to process the non-sinusoidal output signal from both the first and second receiver coils. The processor module also generates a corrected output signal representative of the rotational position of the coupler. The processor module is configured to compute an arctangent of the output signals from the first and second receiving coils, correct at least one error of the plurality of geometric errors from an electrical angle of the arctangent, apply a scaling factor at different operating points of the gap, calculate a slope and an offset parameters that when added equal each of the scaling factors at the different operating points of the gap and store the offset as a corrected value, and compensate the plurality of geometric errors in the output signal by the corrected value.

In another embodiment, a system including a coupler, a sensor, a memory module, and a processor module is provided. The sensor is spaced apart from the coupler to form a gap. The sensor includes a transmitter coil adapted to be energized by a high frequency current source and at least two receiving coils generating a non-sinusoidal output signals, one of the receiver coils generates a sine-like function upon rotation of the coupler and the other of the receiver coils generates a cosine-like function upon rotation of the coupler. The memory module is operable to compensate for the non-sinusoidal output signal caused by a plurality of geometric errors and the gap between the coupler and the at least two receiving coils. The processor module is communicatively coupled to the memory module. The processor module is configured to process the non-sinusoidal output signals from both the first and second receiver coils. The processor module also generates a corrected output signal representative of the rotational position of the coupler. The processor module is configured to determine the plurality of geometric errors in the non-sinusoidal output signals from both the first and second receiver coils and mathematically compensate the non-sinusoidal output signals to eliminate the plurality of geometric errors.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2A schematically depicts illustrative hardware components of a processor module that may be used in correcting for non-sinusoidal input signals according to one or more embodiments shown and described herein;

FIG. 2B schematically depicts an illustrative memory module containing illustrative logic components according to one or more embodiments shown and described herein;

DETAILED DESCRIPTION

Referring generally to the figures, embodiments described herein are directed systems and methods for correcting non-sinusoidal signals generated from non-circular couplers. The system includes a non-circular coupler, a sensor, a memory module, and a processor module. The sensor includes a transmitter coil adapted to be energized by a high frequency current source and at least two receiving coils. The receiver coils generates a sine function upon rotation of the coupler and the other of the receiver coils generates a cosine function upon rotation of the non-circular coupler. The memory module having machine readable instructions that compensate for a plurality of geometric errors in the output signal caused by the non-sinusoidal output signals and a gap between the non-circular coupler and the at least two receiving coils. The processor module communicatively coupled to the memory module. The processor module is configured to process non-sinusoidal output signals from both the first and second receiver coils and also generate an output signal representative of the rotational position of the coupler. The processor module is configured to compute an arctangent of the output signal from the first and second receiver coils, determine at least one error from the plurality of geometric errors from an electrical angle of the arctangent, apply a scaling factor at two different operating points of the gap, calculate a slope and an offset to when added equal each of the scaling factors at the two different operating points of the gap, store the offset as a corrected value, and compensate the plurality of geometric errors in the output signal by the corrected value.

Figure 1:
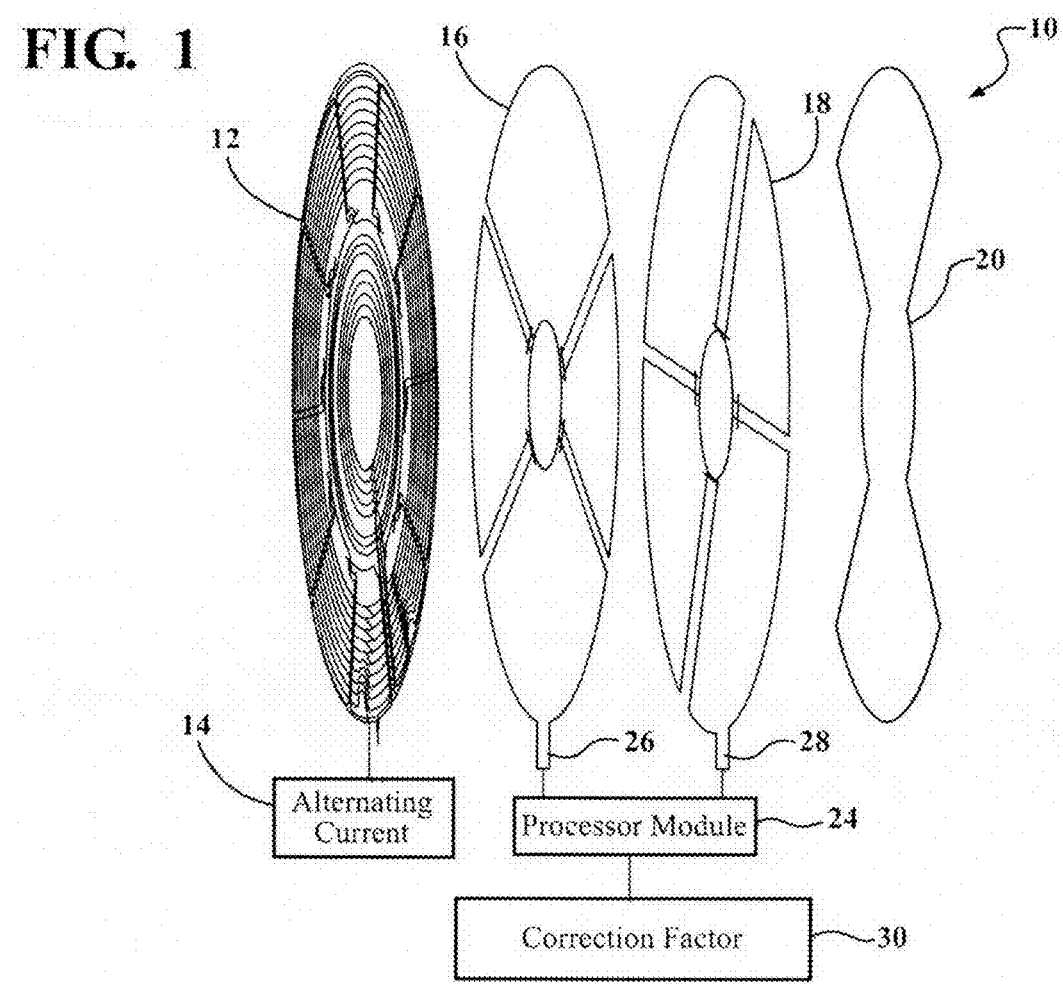
FIG. 1 schematically depicts an exploded view of an example position sensor assembly configured to compensate for non-sinusoidal input signals according to one or more embodiments shown and described.

Referring now to the drawings, FIG. 1 is an exploded view of a position sensor assembly 10 configured to compensate for non-sinusoidal input signals according to embodiments shown and described herein is schematically depicted. As illustrated in FIG. 1, the position sensor assembly 10 includes a transmitter coil 12. The transmitter coil 12 comprises a plurality of loops of conductive material, which are coupled to a high frequency alternating current (AC) source 14, such as a 4 MHz frequency. As illustrated, the loops of the transmitter coil 12 are circular, however, the loops may be in other shapes such as oval. The transmitter coil 12 may be printed on a printed circuit board (PCB) so that, when energized by the high frequency alternating current source 14, the transmitter coil 12 generates a high frequency electromagnetic field. It should be appreciated that the transmitter coil 12 may be disposed on a circuit board, perfboard, stripboard, and/or the like.

The position sensor assembly 10 further includes a first receiving coil 16 and a second receiving coil 18. Both the first and second receiving coils 16, 18 are also printed on the printed circuit board and are generally aligned with the transmitter coil 12. However, it should be appreciated that each or both of the receiving coils 16, 18 need not necessary be aligned with the transmitter coil 12 and, further, that the receiving coils 16, 18 may be disposed on a circuit board, perfboard, stripboard, and/or the like.

Figure 3A:
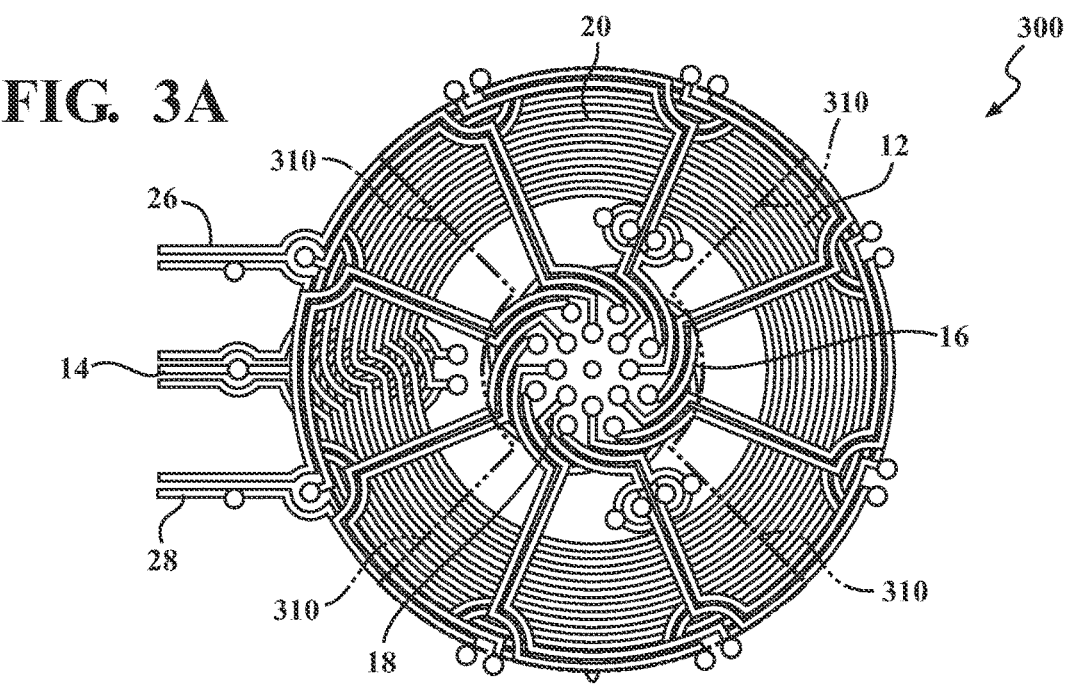
FIG. 3A schematically depicts a top view of an illustrative sensor having a non-circular coupler that produces a non-sinusoidal input signal according to one or more embodiments shown and described herein.

The position sensor assembly 10 further includes a coupler element 20. As illustrated, the coupler element is concentric with both the receiving coils 16, 18 and the transmitter coil 12, however, this is for illustrative purposes and is not limiting. That is, the coupler element 20 may not necessarily be concentric with either or both of the receiving coils 16, 18 and/or the transmitter coil 12. Further, the receiving coils 16, 18, the transmitter coil 12 and the coupler element 20 may be arranged as shown in a sensor assembly 300 (FIG. 3A). The coupler element 20 is constructed of a conductive material so that energization of the transmitter coil 12 will create eddy currents within the coupler element 20 and thus affect the inductive coupling between the transmitter coil 12 and the first and second receiving coils 16. 18. Further, it should be appreciated that while the actual shape of the coupler element 20 is depicted as a half-moon or semicircular shape, the shape may vary depending upon the application, the number of loops in the receiver coils 16, 18, and/or the like. For example, the coupler element 20 may have a generally triangular shape, where, such a generally triangular coupler element may be used, for example, where both the first and second receiver coils had three lobes.

The coupler element 20 may mechanically connected to a shaft, a throttle position, and/or the like such that the rotational position of the coupler element 20 varies proportionally and the rotation of the coupler element 20 may vary the induced voltage in the loops of both the first receiving coil 16 and second receiving coil 18.

Still referring to FIG. 1, the position sensor assembly 10 further includes a processor module 24. The processor module 24 may be a microcontroller. As such, the processor module 24 may contain hardware for processing data, storing data, and/or correcting non-sinusoidal input signals received as output signals 26 and 28 from the receiving coils 16, 18. Thus, the processor module 24 and/or components thereof may perform one or more computing functions, such as receiving data, determining an error, calculating an error correction, storing the error correction, and processing the error correction, as described in greater detail herein.

As such, the processor module 24 may receive data from one or more sources, (i.e. the receiving coils 16, 18) generate data, store data, index data, search data, and/or provide data to an outside source such as an electronic control unit, another processor module, a vehicle (or components thereof), and/or the like. Moreover, the processor module 24 may be used to produce data, such as a correction factor 30, as described in greater detail herein. It should be appreciated that the processor module 24 may function with other computing systems such as an on board vehicle computing systems, a server, a network, a user computing device such as a personal computer, and/or the like.

FIG. 2A schematically depicts illustrative hardware components of the processor module 24 that may be used in correcting for non-sinusoidal input signals. The processor module 24 may be a non-transitory computer-readable medium for completing the various processes described herein, embodied as hardware, software, and/or firmware, according to embodiments shown and described herein. While in some embodiments the processor module 24 may be configured as a general purpose computer with the requisite hardware, software, and/or firmware, in other embodiments, the processor module 24 may also be configured as a special purpose computer designed specifically for performing the functionality described herein. For example, the processor module 24 may be a device that is particularly adapted to utilize mathematically calculation and look-up tables to correct for non-sinusoidal input signals. In another example, the processor module 24 may be a device that is particularly adapted to determine a gap, such as an airgap, between the coupler element 20 and the receiving coils 16, 18 and provide feedback and/or execute commands based on the gap. In embodiments where the processor module 24 is a general purpose computer, the systems and methods described herein provide a mechanism for improving functionality by determining the error is a non-sinusoidal input signal and correcting the error based on determining the gap between the coupler element and the receiving coils 16, 18 such that the efficiency of the position sensor assembly 10 or a received signal is not reduced thus maximizing a coil area to the amiable board area.

Still referring to FIG. 2A, the processor module 24 may include a processing device 204, an I/O hardware 208, a network interface hardware 210, a non-transitory memory component 212, a system interface 214, and a data storage device 216. A local interface 202, such as a bus or the like, may interconnect the various components.

The processing device 204, such as a computer processing unit (CPU), may be the central processing unit of the processor module 24, performing calculations and logic operations to execute a program. The processing device 204, alone or in conjunction with the other components, is an illustrative processing device, computing device, processor, or combination thereof. The processing device 204 may include any processing component configured to receive and execute instructions (such as from the data storage device 216 and/or the memory component 212).

The memory component 212 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 212 may include one or more programming instructions thereon that, when executed by the processing device 204, cause the processing device 204 to complete various processes, such as the processes described herein. Still referring to FIG. 2A, the programming instructions stored on the memory component 212 may be embodied as a plurality of software logic modules, where each logic module provides programming instructions for completing one or more tasks, as described in greater detail below with respect to FIG. 2B.

The network interface hardware 210 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 210 may provide a communications link between the processor module 24 and the other components of a network such as, without limitation, a server computing device.

Figure 2C:
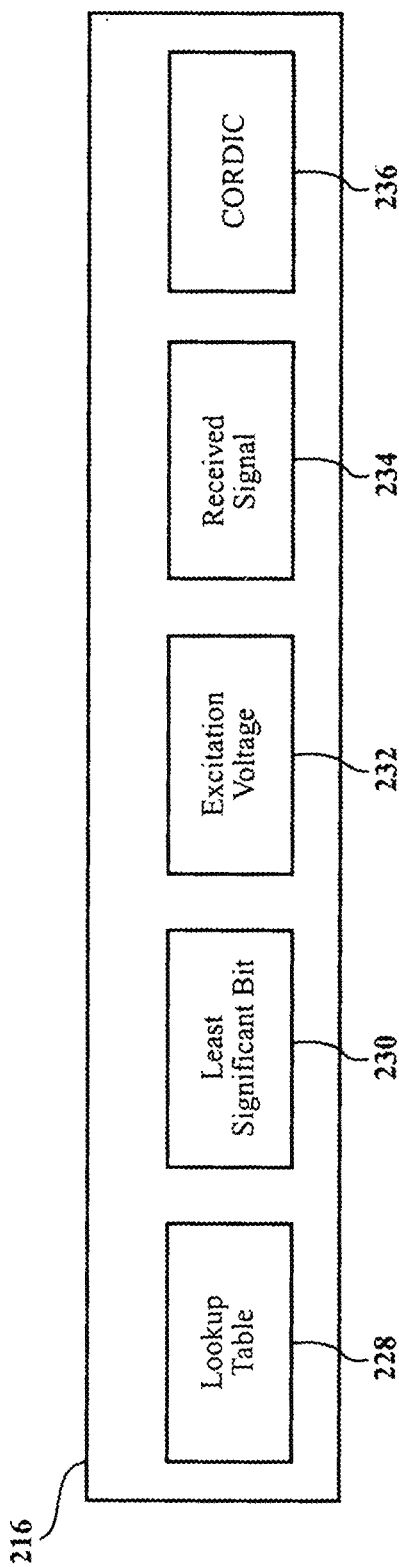
FIG. 2C schematically depicts an illustrative data storage device containing illustrative data components according to one or more embodiments shown and described herein.

Still referring to FIG. 2A, the data storage device 216, which may generally be a storage medium, may contain one or more data repositories for storing data that is received and/or generated. The data storage device 216 may be any physical storage medium, including, but not limited to, a hard disk drive (HDD), memory, removable storage, and/or the like. While the data storage device 216 is depicted as a local device, it should be understood that the data storage device 216 may be a remote storage device, such as, for example, a server computing device or the like (e.g., the server computing device). Illustrative data that may be contained within the data storage device 216 is described below with respect to FIG. 2C.

Still referring to FIG. 2A, the I/O hardware 208 may communicate information between the local interface 202 and one or more other components. For example, the I/O hardware 208 may act as an interface between the processor module 24 and other components, such as an external electronic control module and/or the like. In some embodiments, the I/O hardware 208 may be utilized to transmit one or more commands to the other components.

The system interface 214 may generally provide the processor module 24 with an ability to interface with one or more external devices such as, for example, user computing devices and/or server computing devices. Communication with external devices may occur using various communication ports (not shown). An illustrative communication port may be attached to a communications network.

With reference to FIG. 2B, in some embodiments, the program instructions contained on the memory component 212 may be embodied as a plurality of software modules, where each module provides programming instructions for completing one or more tasks. For example, FIG. 2B schematically depicts the memory component 212 containing illustrative logic components according to one or more embodiments shown and described herein. As shown in FIG. 2B, the memory component 212 may be configured to store various processing logic, such as, for example, operating logic 220, scale factor logic 222, excitation voltage versus received signal ratio logic 224, and/or offset constant logic 226 (each of which may be embodied as a computer program, firmware, or hardware, as an example). The operating logic 220 may include an operating system and/or other software for managing components of the processor module 24 (FIG. 2A). Further, the operating logic 220 may contain one or more software modules for transmitting data, and/or analyzing data.

Still referring to FIG. 2B, the scale factor logic 222 may contain one or more software modules for collecting data from one or more sources (e.g. a look up table, server computing device, another processor module and/or the like), as described in greater detail herein. Moreover, the scale factor logic 222 may determine a peak error or magnitude in a least significant bit, determine a coordinate rotation digital computer (CORDIC) algorithm, determine CORDIC coefficients, and/or the like.

The scale factor logic 222 may reside on different computing devices. As an example, one or more of the functionalities and/or components described herein may be provided by the user computing device and/or the server computing device, which may be commutatively coupled to the memory component 212 via the network, such that access to the scale factor logic 222 may be provided. For example, the processing device 204 (FIG. 2A) may access the scale factor logic 222 to communicate and retrieve the look-up table data and then use the server computing device and/or the like to manipulate the look-up table data.

The excitation voltage versus received signal ratio logic 224 may contain one or more software modules for determining a ratio between an excitation voltage as applied to the transmitter coil 12 and a received signal by the processor module 24, as described in greater detail herein. The excitation voltage versus received signal ratio logic 224 may be used to determine or estimate the gap between the receiving coils 16, 18 and the coupler element 20. The offset constant logic 226 may contain one or more software modules for determining an offset constant. It should be appreciated that the offset constant may be determined externally and then added, or subtracted, to the ratio, such that a value is obtained and applied to the scaling factor at each operating point, as discussed in greater detail herein. It should also be appreciated that the offset constant parameter may be obtained from simulation or real part measurements. A best fit line may be obtained with two points using a slope and the offset constant or multiple points along the curve to get the best fit line from there.

FIG. 2C schematically depicts a block diagram of various data contained within a storage device (e.g., the data storage device 216). As shown in FIG. 2C, the data storage device 216 may include, for example, a plurality of stored look-up table data 228, such as a plurality of 8 bit signed integers.

Moreover, it should be understood that the plurality of stored look-up table data 228 may be predetermined data gathered based on testing and simulation. It should also be understood that the plurality of stored look-up table data 228 may also be data gathered and transmitted to, or downloaded to the plurality of stored look-up table data 228 via the network interface 210 (FIG. 2A). The plurality of stored look-up table data 228 may be received, for example, from the server computing device or from, for example, the user computing device. It should be appreciated that the plurality of stored look-up table data 228 may or may not be stored permanently.

The data storage device 216 may further include, for example, a least significant bit data 230, which may be extracted from the peak error or magnitude of a real data wave and a peak or magnitude of a lookup table (LUT) wave, as discussed in greater detail herein. It should be appreciated that the peak error may be referred to as an amplitude error or a magnitude. That is, as will be discussed in greater detail, there is a magnitude of a signature of the error, or the LUT, and there is a magnitude of the error in the real data. The scaling factor may be the ratio between the two.

The data storage device 216 further includes a plurality of excitation voltage data 232, a plurality of received signal data 234, and/or a plurality of CORDIC data 236. The plurality of excitation voltage data 232 and the plurality of received signal data 234 may be received from the processing device 204 (FIG. 2A). The plurality of excitation voltage data 232 and the plurality of received signal data 234 are used as a ratio to estimate the gap, which may be an airgap, between the coupler element 20 and the receiving coils 16, 18, as will be discussed in greater detail herein. As such, the processing device 204 (FIG. 2A) may be configured to transmit current excitation voltage data and current received signal data to the data storage device 216. The current excitation voltage data and the current received signal data the may be captured in real time, as will be discussed in greater detail herein. The CORDIC data 236 may contain stored CORDIC coefficients and other data related to CORDIC algorithms.

It should be understood that the components illustrated in FIGS. 2A-2C are merely illustrative and are not intended to limit the scope of this disclosure. More specifically, while the components in FIGS. 2A-2C are illustrated as residing within the processor module 24, this is a non-limiting example. In some embodiments, one or more of the components may reside external to the processor module 24.

Further, it should be understood that the processor module 24 may be a steady state device, an application specific integrated circuit (ASIC) device, and/or the like. As such, these devices may have different components or the components within these devices are configured to perform the correction factor without modifying the scope of this disclosure. Further, it should be appreciated that in embodiments, the correction factor may be obtained off of the ASIC using raw values.

Figure 3B:
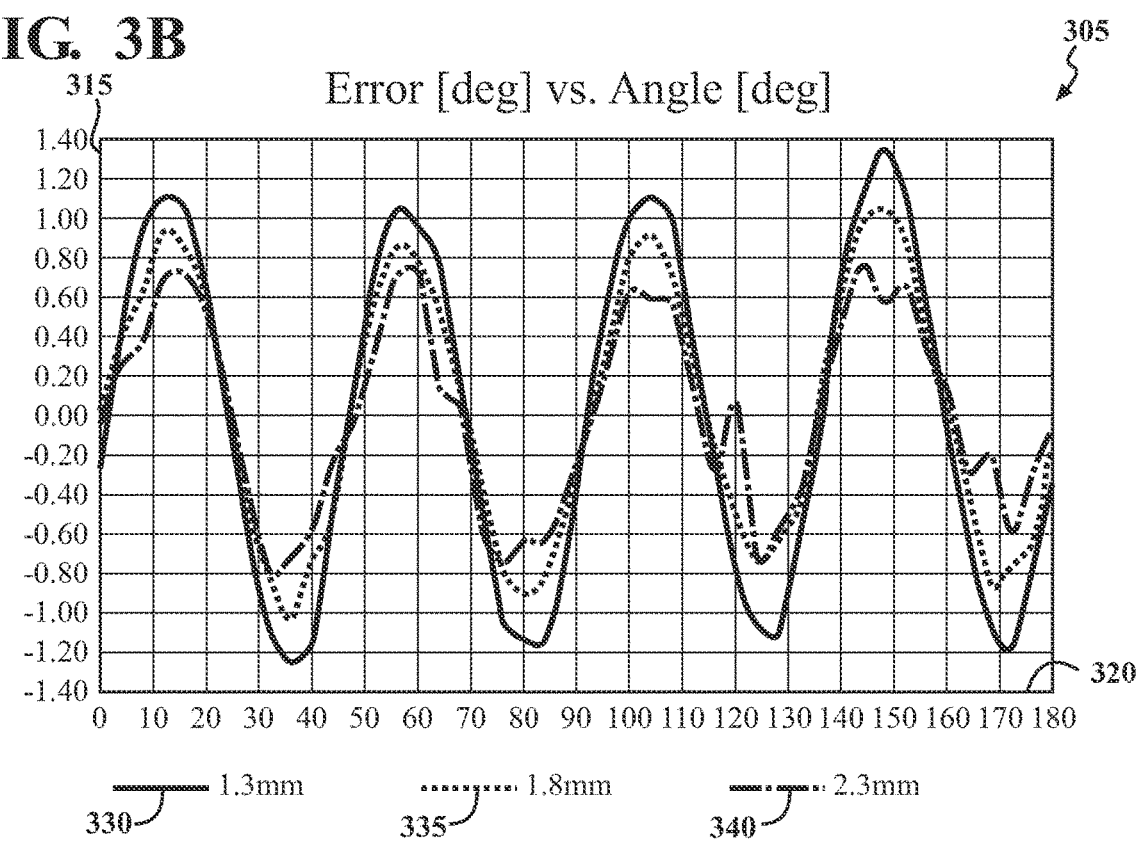
FIG. 3B schematically depicts a corresponding graph of the sensor of FIG. 3A according to one or more embodiments shown and described herein.

Now referring to FIGS. 3A-3B where a sensor 300 produces the non-sinusoidal input signal and a corresponding graph 305 is schematically depicted. Generally, the sensor 300 is identical to the position sensor assembly 10 however, here, the coupler element 20 may have multiple straight edges 310, such as those found in a triangular couplers. FIG. 3B is a graph depicting an error versus an angle where an ordinate 315 is the error in degrees and an abscissa 320 is the angle in degrees. Further, a 1.3 mm gap 330 is plotted, a 1.8 mm gap 335 is plotted, and a 2.3 mm gap is plotted, described in further detail herein.

Still referring to FIGS. 3A-3B, as discussed above, the induced voltage on the output signal 26 from the first receiving coil 16 will vary as a sine-like function as the coupler element 20 is rotated in a clockwise direction. Conversely, since the second receiver coil 18 may be effectively electrically rotated 90 degrees from the first receiving coil 16, the induced voltage on the output signal 28 from the second receiver coil 18 will vary as a cosine-like function of the rotational angle of the coupler element.

Consequently, because of the non-sinusoidal inputs which may be caused by the coupler element 20 shape, and in particular, the multiple straight edges 310 of the coupler element 20, the non-sinusoidal signals that are captured by the receiving coils 16, 18 and output as output signals 26, 28 to the processor module 24 (FIG. 1). As shown in FIG. 3B, the non-sinusoidal input signal into the processor module 24 (FIG. 1) from the output signals 26, 28 vary with the gap between the coupler element 20 and the receiving coils 16, 18. In particular, as illustrated, as the gap varies, there is the signature of error associated with the LUT. Further, as the gap is changing, so does a magnitude of the error. For instance, the magnitude of the 1.3 mm gap 330 is plotted at approximately 1.1 degrees while the error of the 1.8 mm gap 335 is approximately 0.95 degrees and the 2.3 mm gap 340 is approximately 0.7 degrees. As such, the smaller the gap the higher the error and the lower the received signal. Further, it should be appreciated that the gap is dynamic changing the signature of error. As such, the error changes from 1.1 degrees at 1.3 mm gap 330 down to 0.7 degrees at 2.3 mm gap 340 such that there is a proportionally constant of −0.4 degrees lower so now a slope constant relative to gap is −0.4.

However, the system may not know the gap. Instead, to correct for this error, as explained in detail below, the system is configured to determine the excitation voltage as a ratio of the received signal value to multiple by the slope. As such, the system may use the ratio of excitation voltage over received signal, where generally either the excitation voltage or the received signal is constant to get a ratio value and the system obtains the offset constant, which is a coordinate, for each scaling factor at a particular operating point. In some embodiments, the system may use the excitation voltage multiplied by the received signal value and gain values. Therefore, to correct for the signature of error, the following equation is used:

$$\text{scale factor} = m\left(\frac{\text{excitation voltage}}{\text{received signal}}\right) + \text{offset constant} \quad \text{Equation 1}$$

Equation 1 may follow the concept of a linear line equation such as y=mx+b where y is the scale factor, the slope is m, x is the ratio of excitation voltage versus received signal and b is the offset constant as a coordinate.

Figure 4A:
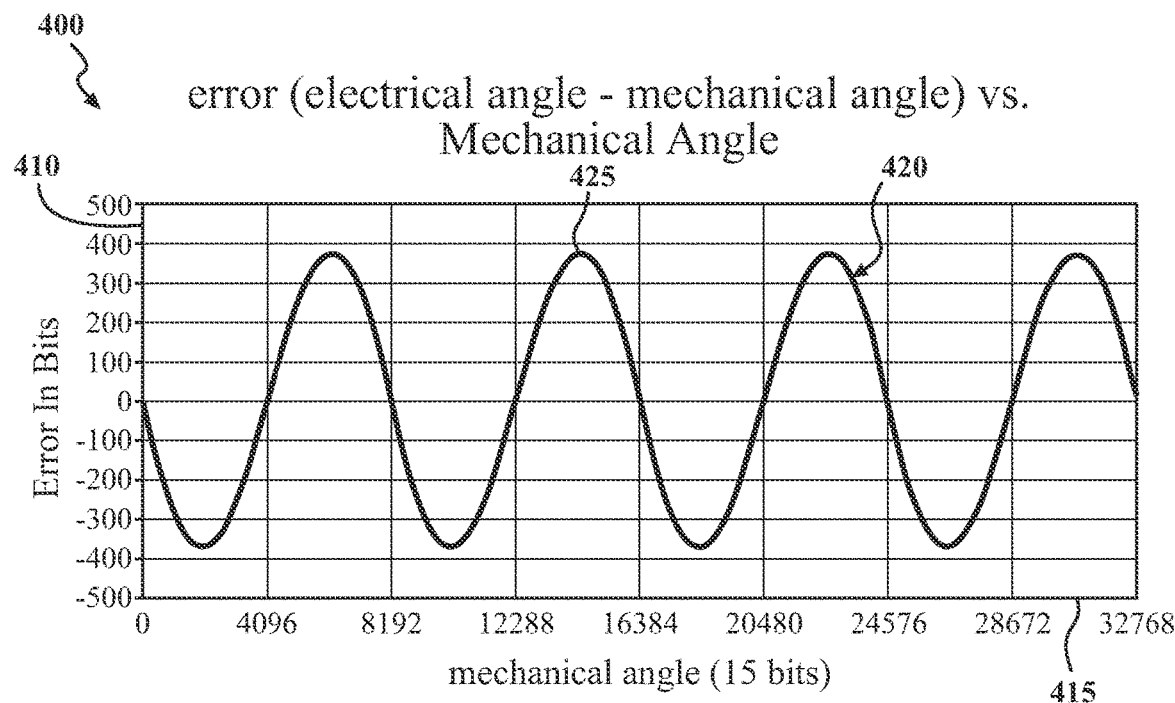
FIG. 4A schematically depicts an error versus mechanical angle plot according to one or more embodiments shown and described herein.
Figure 4B:
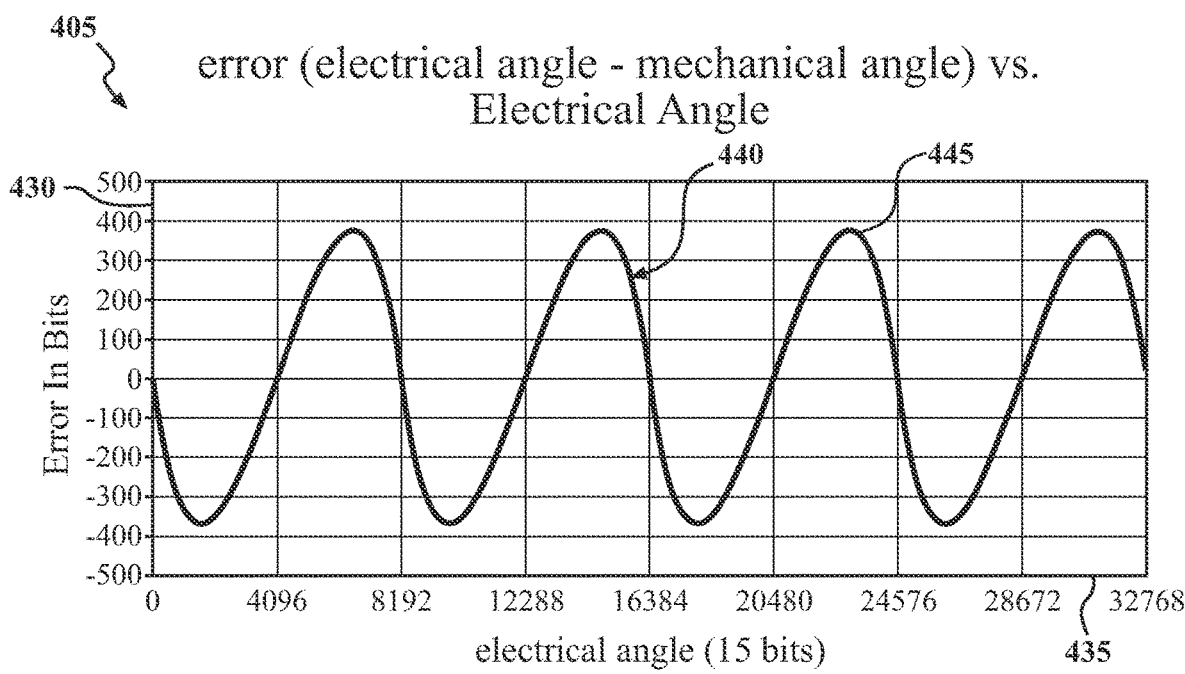
FIG. 4B schematically depicts an error versus electrical angle plot according to one or more embodiments shown and described herein.
Figure 4C:
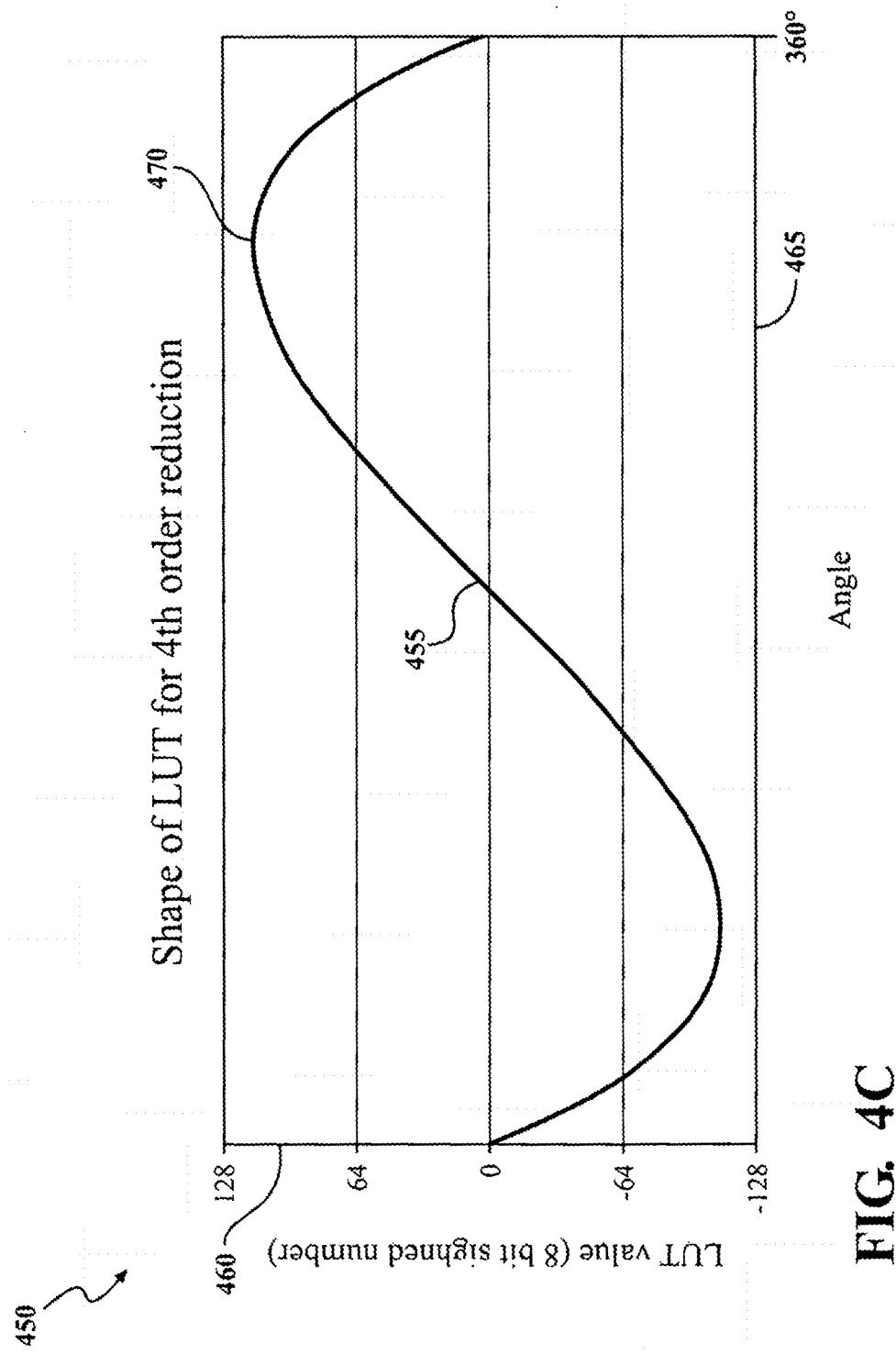
FIG. 4C schematically depicts a shape for error reduction in a look-up table according to one or more embodiments shown and described herein.

With reference now to FIGS. 4A-4C, the scaling factor calculations will now be discussed. The scale factor "y" is determined by the following equation:

$$\text{scale factor} = \frac{\text{peak error in } LSb}{\text{maximum value in lookup table}} \quad \text{Equation 2}$$

It should be appreciated that the scale factor is calculated at more than one operating point. To determine the peak error in least significant bits (LSB), the error, or non-sinusoidal input signal, which may be a 4th order harmonic error, needs to be isolated so that the peak error and the mechanical angle may be separated to determine the $4^{th}$ order component. It should be appreciated that 4th order harmonics require algorithms to produce a correction factor that fundamentally eliminates errors associated with the gaps, as discussed above. It should also be appreciated that because there is a sinusoidal shaped error relative to the mechanical angle that needs to be corrected for, the correction value implemented through the algorithm may be implemented in software many different ways including, without limitation, through the LUT. As such, the LUT is known is herein commonly referred to as the signature of error. Additional methods for a correction in place of a LUT is to use a CORDIC algorithm to recreate the sinusoidal error shape. A CORDIC algorithm may be applied in two different ways, the CORDIC can be used to directly replace the LUT with the scale factor applied to it, or a unique scale factor can be applied to the CORDIC coefficients and thus directly correcting with no additional steps.

Still referring to FIGS. 4A-4C, where FIG. 4A is an error versus mechanical angle plot 400 having an ordinate 410 as an error in bits and an abscissa 415 as a mechanical error in bits, described in further detail herein. The error is depicted as a shifted sine-like wave 420 that repeats four times during the mechanical rotation. While the shape remains constant, an amplitude 425 of the wave caused from the error changes, as discussed above. FIG. 4B is a an error versus electrical angle plot 405 where an ordinate 430 is an error in bits and an abscissa 435 is an electrical angle in bits, described in further detail herein. A fourth order harmonic error 440 is depicted as an even more shifted sine like wave 445 with respect to the shifted sine-like wave 420 of FIG. 4A. FIG. 4C is a graph 450 of a LUT schematically depicting a shape for error reduction, such as a wave 455, the graph 450 having an ordinate 460 as a LUT maximum value as an 8 bit signed integer and an abscissa 465 as an angle. A maximum value, a peak, or an amplitude 470 of the wave 455 is depicted and will be described in further detail herein.

With reference to FIG. 4A-4B, access to the mechanical angle on a device is limited, therefore an arc tangent function with two arguments is used to determine the electrical angle. That is in order to obtain the mechanical, or rotational angle of the coupler element 20, it is necessary to take the arc tangent of both the sine and cosine like functions on the output signals 26 and 28 from the first and second receiving coils 16, 18 respectively. This arc tangent function is given as follows:

$$\partial = \frac{\partial = \operatorname{atan2}(y, x)}{N}, \operatorname{atan2}(y, x) = \left(\frac{y}{\sqrt{x^2 + y^2} + x}\right) \quad \text{Equation 3}$$

As such, the calculated electrical angle includes the error that once removed, the shape of the error may be identified when plotted against the electrical angle returned by the arctangent 2 function, as shown in FIG. 4B.

As shown in FIG. 4B, the error is shifted. That is, the shape of the error in the sine wave is shifted. As an example computation, the scale factor may be determined from FIGS. 4A-4C by first determining the peak error of the wave, here it is approximately 0.5% (ignoring the DC offset). As such, because this is a 15 bit angle, the equivalent peak would be:

32768*0.005=164 LSB

On the other hand, if this were a 16 bit angle, the equivalent peak would be:

65536*0.005=328 LSB

The peak or the amplitude 470 of the wave 455 of the LUT in FIG. 4C is approximately 113. As such, for the 15 bit angle, the scale factor may be calculated by:

$$\text{scale factor} = \frac{164}{113} = 1.451$$

For a 16 bit angle, the scale factor is 2.903. It should be appreciated that the scaling factor computation as described above is completed at two operating points. In some embodiments, the scaling factor computation may be completed at more than two operating points.

It should be appreciated that the scaling factor is always changing because there is a constant and dynamic factor. Further, it should be appreciated that the scaling factor is a proportional constant. That is an advantage of the scaling factor in that the scaling factor is able to compensate for changes in coils, changes in the gap, changes in the poles, and/or the like. An additional advantage of the scaling factor is that any inaccuracies of the induced voltage on either the first or second receiving coils 16, 18 caused by variations in the air gap between the coils and the coupler element, temperature, humidity, and the like will be scaled by the same error factor for both the sine function and the cosine function. Consequently, any such error due to environmental conditions or manufacturing tolerances is automatically compensated for and canceled out. Further, it should be appreciated that there does not need to be a linear approximation, there can be a higher order function or fixed value for the scaling factor.

With the scale factor known at different operating points, the other side of the equation 1 may now be determined for each scale factor at each operating point so that a slope and offset and subsequently a correction value may be determined. As discussed above, the excitation voltage versus received signal ratio is the x value in y=mx+b equation and is determined to estimate the gap between the coupler element 20 (FIG. 1) and the receiving coils 16, 18 (FIG. 1). The excitation voltage is depicted as the AC source 14 (FIG. 1) having a 4 MHz frequency. As such, the excitation voltage versus received signal ratio is dynamic with each operating point. Therefore, generally, only one of the excitation voltage or the received signal is changing during the calculation. Once the ratio is determined (i.e. the gap is estimated), the processor module 24 adds or subtracts the offset constant, as the coordinate, to the excitation voltage versus received signal ratio.

A slope may now be calculated using the following equation:

$$\text{Slope} = \frac{(\text{Error 1st operating point}) - (\text{Error of 2nd operating point})}{(\text{gap of 1st operating point}) - (\text{gap of 2nd operating point})}; \quad \text{Equation 4}$$

wherein the error 1st operating point is the scale factor error from the first operating point and the error 2nd operating point is the scale factor error from the second operating point, in which the error from the 1st operating point is subtracted from the error from the 2nd operating second point to obtain a delta scale factor error value, and wherein the gap obtained from the first scale factor operating point is subtracted from the gap of the second scale factor operating point to obtain a delta gap value. The delta scale factor error value is divided by the delta gap value to obtain the slope, or m. It should be appreciated that the constant b's cancel out with the subtractions. That is, the scale factor is determined at two operating points with the delta difference divided by the ratio taken at two different points to obtain an estimated delta gap. The delta scale factor difference is divided by the delta gap difference to obtain the slope. With the slope known, the slope may be substituted into one of the points in equation 1 to obtain the constant offset. Therefore, the equated slope and offset constant are the correction value required for the determined error at the determined gap.

It should be appreciated that because the scaling factor and/or the excitation voltage versus received signal ratio are dynamic between sensor assemblies, during operation, and/or the like, the offset constant also is adaptable and able to dynamically change such that any sensor system where the raw signal has a harmonic that is approximated by a sine and cosine wave input, such as, without limitation, inductive sensors, Hall effect sensors, linear sensors, two-input sensors, magneto inductive sensors, and/or the like.

Furthermore, couplers may vary in shape by outside diameter, inside diameter, quarter moon, half moon, full moon, and void or no void or some combination thereof. It is clear from the instant disclosure that many variations are within the scope of the invention. For instance, the coupler may become larger, have a void or no void, the range of the sensor may change, and the LUT may evolve to $8^{th}$ order harmonics to correct for errors associated with mismatches between the coupler included angle and the coil angle. Some deviations from a sine or cosine wave are known and thus the LUT is not required to correct them, for instance, a $1^{st}$ order static offset or a $1^{st}$ order dynamic geometry based offset influenced by the transmitter strength.

On the other hand, 4th and 8th order offsets are that much more complicated and require algorithms to produce a correction factor that fundamentally eliminates errors associated with the gaps. When using the LUT method as discussed above to correct for higher order errors, such as the $8^{th}$ order, simply double the LUT reference to get the value that corrects for the higher harmonic.

The benefit of the methods, algorithm, and/or calculations as discussed herein is such as the measurement of a linear distance with the X (or Y) and Z components of the magnetic field are not pure sinusoidal. Therefore, they have a errors that are typically corrected by multipoint corrections. However, the method described herein will correct the 4th order error with only the scale factor, thus reducing the calibration points needed, or freeing them for other user calibrations. Additionally, it should be appreciated that a fixed correction factor may still be used in systems where an air gap does not change.

Although the present invention has been described as a position sensor having a pair of receiving coils, each having receiving loops, the receiving coils can have any even number of receiving loops. For example, a first receiving coil 16 and a second receiving coil 18, each having four separate loops, six separate loops, and/or the like.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. A sensor system comprising:
a coupler;
a sensor spaced apart from the coupler to form a gap, the sensor comprising a transmitter coil adapted to be energized by a high frequency current source and at least two receiving coils generating a non-sinusoidal output signals, one of the receiver coils generates a sine-like function upon rotation of the coupler and the other of the receiver coils generates a cosine-like function upon rotation of the coupler;
a memory module operable to compensate for the non-sinusoidal output signal caused by a plurality of geometric errors and the gap between the coupler and the at least two receiving coils; and
a processor module communicatively coupled to the memory module, the processor module configured to process the non-sinusoidal output signal from both the first and second receiver coils, the processor module also generates a corrected output signal representative of the rotational position of the coupler, the processor module configured to:
compute an arctangent of the output signals from the first and second receiver coils;
correct at least one error of the plurality of geometric errors from an electrical angle of the arctangent;
apply a scaling factor at different operating points of the gap;
calculate a slope and an offset parameters that when added equal a value for each of the scaling factors at the different operating points of the gap;
store the value as a corrected value; and
compensate the at least one of the plurality of geometric errors in the output signal by the corrected value.

2. The sensor system of claim 1, wherein the gap is an airgap, the gap being dynamic.

3. The sensor system of claim 1, wherein at least one error of the plurality of geometric errors is a fourth order harmonic error or an eighth order harmonic error, the corrected value is doubled to compensate for the eighth order harmonic error.

4. The sensor system of claim 1, wherein the scaling factor is a dynamic constant including the slope and the offset.

5. The sensor system of claim 4, wherein the scaling factor is a dynamic parameter proportional to the gap.

6. The sensor system of claim 5, wherein the gap is determined by a ratio parameter of an excitation voltage versus a received signal value, the ratio is then multiplied by a slope parameter.

7. The sensor system of claim 6, wherein the ratio parameter of the excitation voltage versus the received signal value is a dynamic value.

8. The sensor system of claim 7, wherein the slope and the offset parameters are proportional constants configured adapt to changes such as a pole change, a gap change, or a coil change.

9. The sensor system of claim 6, wherein as the ratio parameter of the excitation voltage versus the received signal value increases, the scaling factor decreases.

10. The sensor system of claim 4, wherein the scaling factor is the following equation:

$$\text{scaling factor} = \frac{\text{peak error in least significant bits}}{\text{Maximum value in a look-up table}}$$

where a peak error in least significant bits is determined by calculating a magnitude of the peak error for a specific bit angle and multiplied by a change in the excitation voltage versus the received signal value; and a maximum value in a look-up table is a magnitude of a wave that is predetermined in the look-up table.

11. The sensor system of claim 1, wherein a CORDIC algorithm having a preprogrammed offset corresponding to the corrected value is used by determining the scale factor without additional steps or a unique scale factor is applied to a plurality of CORDIC coefficients to determine the corrected value without additional steps.

12. The sensor system of claim 1, wherein at least one of the plurality of geometric errors in the output signal includes a sinusoidal shaped error relative to a mechanical angle.

13. The sensor system of claim 12, wherein the sinusoidal shaped error relative to the mechanical angle is a fourth order harmonic error.

14. The sensor system of claim 1, wherein the memory module and the processor module are within a steady state device.

15. A system comprising:
a coupler;
a sensor spaced apart from the coupler to form a gap, the sensor comprising a transmitter coil adapted to be energized by a high frequency current source and at least two receiving coils generating a non-sinusoidal output signals, one of the receiver coils generates a sine-like function upon rotation of the coupler and the other of the receiver coils generates a cosine-like function upon rotation of the coupler;
a memory module operable to compensate for the non-sinusoidal output signal caused by a plurality of geometric errors and the gap between the coupler and the at least two receiving coils; and
a processor module communicatively coupled to the memory module, the processor module configured to process the non-sinusoidal output signals from both the first and second receiver coils, the processor module also generates a corrected output signal representative of the rotational position of the coupler, the processor module configured to determine at least one error of the plurality of geometric errors in the non-sinusoidal output signals from both the first and second receiver coils and mathematically compensate the non-sinusoidal output signals to eliminate the at least one error in the plurality of geometric errors.

16. The system of claim 15, wherein the processor module determines the plurality of geometric errors in the non-sinusoidal output signals by computing an arctangent of the output signal from the first and second receiver coils and correcting at least one of the plurality of geometric errors from an electrical angle of the arctangent.

17. The system of claim 16, further comprising:
the processor module is configured to apply a scaling factor at different operating points of the gap;
the processor module is configured calculate a slope and an offset parameters that when added equal a value for each of the scaling factors at the different operating points of the gap;
the processor module is configured store the value as a corrected value; and
the processor module is configured to compensate the fourth order harmonic error in the output signal by the corrected value.

18. The system of claim 15, wherein the gap is an airgap.

19. The system of claim 15, wherein at least one error in the plurality of geometric errors is a fourth order harmonic or an eighth order harmonic, the corrected value is doubled to compensate for the eighth order harmonic errors.

* * * * *